United States Patent
Lecolier et al.

(10) Patent No.: US 7,892,348 B2
(45) Date of Patent: Feb. 22, 2011

(54) WELL CEMENTING MATERIAL

(75) Inventors: Eric Lecolier, Chaville (FR); Alain Rivereau, Rueil Malmaison (FR)

(73) Assignee: Institut Francais du Petrole, Cedex (FR)

( * ) Notice: Subject to any disclaimer, the term of this patent is extended or adjusted under 35 U.S.C. 154(b) by 0 days.

(21) Appl. No.: 12/555,859

(22) Filed: Sep. 9, 2009

(65) Prior Publication Data

US 2010/0010108 A1 Jan. 14, 2010

Related U.S. Application Data

(62) Division of application No. 11/236,743, filed on Sep. 28, 2005, now abandoned.

(30) Foreign Application Priority Data

Sep. 29, 2004 (FR) .................................. 04 10330

(51) Int. Cl.
C04B 24/00 (2006.01)
(52) U.S. Cl. .................. 106/696; 106/713; 106/724; 106/726; 106/737; 106/823; 106/DIG. 1; 166/292; 166/293
(58) Field of Classification Search ................. 106/696, 106/713, 724, 726, 737, 823, DIG. 1; 166/292, 166/293
See application file for complete search history.

(56) References Cited

U.S. PATENT DOCUMENTS 4,234,344 A * 11/1980 Tinsley et al. ................ 106/672

| 5,806,594 | A |   | 9/1998 | Stiles et al. |
| 5,820,670 | A | * | 10/1998 | Chatterji et al. ............. 106/737 |
| 6,060,535 | A | * | 5/2000 | Villar et al. ................. 166/293 |
| 2008/0302277 | A1 | * | 12/2008 | Naji et al. .................... 106/692 |

FOREIGN PATENT DOCUMENTS

| EP | 0950034 | 10/1999 |
| EP | 1069091 | 1/2001 |
| EP | 1195362 | 4/2002 |
| FR | 2759088 | 8/1998 |
| FR | 2770517 | 5/1999 |
| FR | 2804953 | 8/2001 |
| GB | 2213850 | 8/1989 |

* cited by examiner

*Primary Examiner*—Paul Marcantoni
(74) *Attorney, Agent, or Firm*—Antonelli, Terry, Stout & Kraus, LLP.

(57) ABSTRACT

The present invention relates to a formulation of a high-performance foamed cement material, comprising:
at least one hydraulic binder,
microparticles whose grain size ranges between 0.1 and 30 μm, whose proportion ranges between 15% and 50% by mass in relation to the mass of hydraulic binder,
mineral particles whose grain size ranges between 1 and 500 μm, whose proportion ranges between 10% and 35% by mass in relation to the mass of hydraulic binder, the proportion of particles being lower than the proportion of microparticles,
a hydrosoluble polymer thinning agent whose proportion ranges between 0.1% and 8% by mass in relation to the mass of hydraulic binder,
water whose proportion is at most 40% by mass in relation to the mass of hydraulic binder,
a foaming agent whose proportion ranges between 0.1% and 10% by mass in relation to the mass of hydraulic binder.

15 Claims, 2 Drawing Sheets

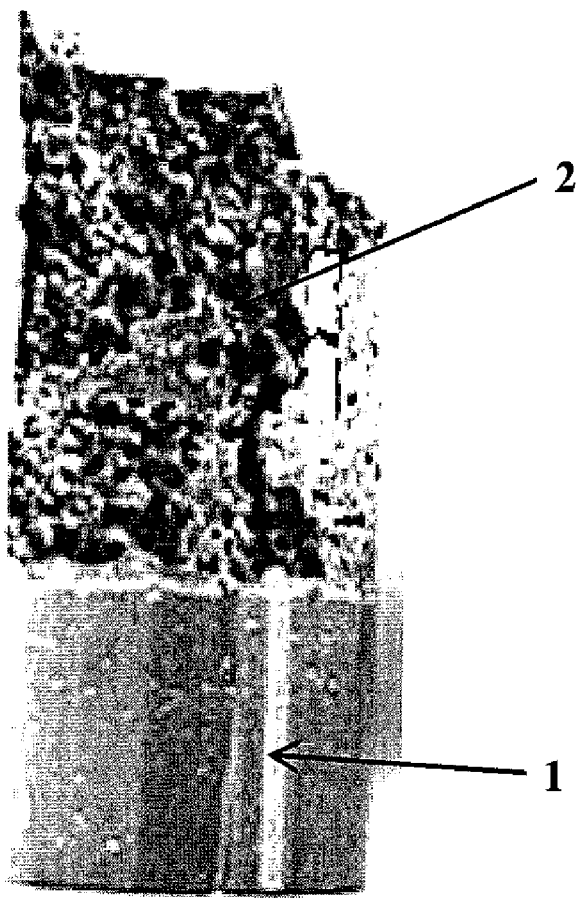
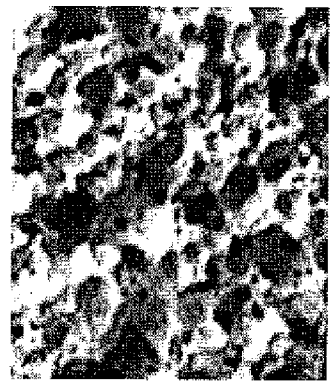
FIG.1
FIG.2
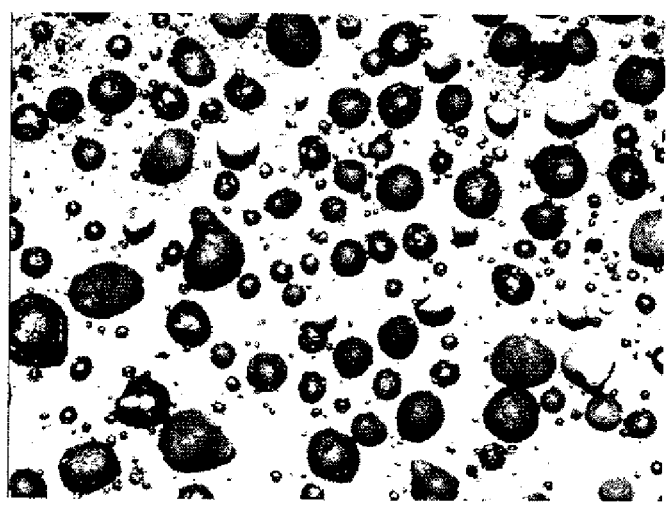
FIG.3

WELL CEMENTING MATERIAL

CROSS-REFERENCE TO RELATED APPLICATION

This application is a divisional application of U.S. application Ser. No. 11/236,743, filed Sep. 28, 2005, now abandoned the contents of which are incorporated herein by reference.

FIELD OF THE INVENTION

The present invention relates to a slurry for cementing a well, notably a well intended for exploration or development of underground reservoirs, such as hydrocarbon or geothermal reservoirs. The invention provides new cementing material formulations having simultaneously low densities, high mechanical properties and a low permeability.

BACKGROUND OF THE INVENTION

Hydrocarbon development well cementing is a complex operation with multiple goals: mechanically secure the casing strings in the geologic formation, isolate a producing layer from adjacent layers, protect the strings against the corrosion due to the fluids contained in the layers crossed through. The cement sheaths therefore have to provide good mechanical strengths and low permeability to the fluids and to the gas contained in the formations drilled.

Under certain geothermal or hydrocarbon reservoir development conditions, it is essential to have cementing materials with both low densities and excellent physical properties (mechanical strength and permeability). These two conditions are difficult to combine with conventional cementing materials. It is well-known since Féret's research work that the mechanical strength varies conversely to the porosity. Féret notably showed that the compressive strength Rc was expressed as follows:

$$R_c(t) = K(t)\left(\frac{c}{c+e+v}\right)^2$$

where c, e and v are the volumes of cement, water and air respectively, and K(t) a kinetic function.

In order to lighten cementing slurries, it is common practice to increase either the amount of water or the amount of air (using hollow balls or by entraining intentionally a large amount of air so as to form a cement foam). According to the above formula, these two means lead to a mechanical strength degradation and, simultaneously, to a great increase in the permeability of the hardened material.

When the formations drilled are fragile and unconsolidated, it is impossible to carry out operations with a dense cement slurry for fear of exceeding the fracture pressure of the formations. This problem is notably encountered when cementing the casings of offshore wells or wells drilled in mature fields.

To cement wells crossing fragile formations, i.e. with a low fracture gradient, it is well-known to significantly lighten the slurry by adding gas. This gas can be introduced by means of hollow ceramic or glass microspheres. This technique is notably described in documents U.S. Pat. No. 3,804,058 and U.S. Pat. No. 4,252,193. The gas can also be introduced into the slurry by creating a foam by means of foaming agents added to this slurry. This technique is notably described in documents U.S. Pat. No. 5,806,594 and U.S. Pat. No. 5,484,019.

Cements lightened by means of hollow balls have certain drawbacks. One drawback is the destruction of the balls under the effect of the hydrostatic pressure. This destruction translates into a density increase while pumping the slurry: the fracture pressure can thus be reached. Another drawback of hollow glass balls comes from the destruction, in the hardened cement, of the walls of the balls as a result of pozzolanic reactions. This destruction translates into an increase in the permeability of the cement matrix.

Common formulations of a foamed cement slurry for cementing wells comprise a proportion of water ranging between 40% and 60% by weight of cement. This high water amount, necessary to lower the cement slurry densities and to optimize the rheology, generates a high porosity which translates into poor properties of the cement sheath in terms of permeability, mechanical strength, cracking and durability.

The problem now consists in formulating a pumpable hydraulic binder foam (i.e. having a viscosity range compatible with the viscosities required for setting the slurry in the annulus) for cementing oil wells or other wells, with higher mechanical strengths and a lower permeability. The present invention therefore describes the way to formulate a low-density cementing material by introducing gas in form of bubbles that will be separated by a very compact cement matrix. In this case, although the material obtained is very porous, the permeability of this material remains very low because the invention described allows to obtain a foamed cement wherein the bubbles are not interconnected.

There are cement formulations with much better mechanical properties, as described for example in document EP-950,034. These formulations are based on maximization of the packing volume fraction by optimization of the grain size of the mineral particles. In fact, it has been known for a long time in the profession (see Féret's formula above) that the properties of cement materials are improved by increasing the compactness of the mixture (or, which comes to the same thing, by reducing the porosity). These materials can have compressive strengths above 100 MPa and gas permeabilities of the order of one nanoDarcy. It is well-known that the viscosity of suspensions increases exponentially with the volume fraction in solid particles: the significant increase in the cement slurry viscosity is very serious from an operational point of view because, in this case, the material can no longer be set in place by pumping. Now, in the invention described in document EP-950,034, optimization of the grain packing of the mixture of mineral powders achieved by properly selecting both the size of the mineral particles and their concentration allows to obtain slurries that are much more fluid than conventional cement slurries. Unlike conventional cements, the high-performance cementing materials described in document EP-950,034 can have a zero yield point. However, the densities of these high-performance cements as described in document EP-950,034 are above 1.9 g.cm$^{-3}$ and they are therefore not suitable for cementing fragile and unconsolidated zones such as those encountered in deep-sea drilling or for cementing wells in depleted reservoirs. Recently, low-density formulations, typically ranging between 1.2 and 1.6 g.cm$^{-3}$, were developed for cementing wells drilled in unconsolidated geologic layers. These cementing materials are high-performance materials to which hollow microspheres have been added. These materials thus have the same drawbacks as conventional cements containing hollow microspheres: microsphere crushing during pumping in the well, pozzolanic reaction between the portlandite and the silica contained in the microsphere walls. Furthermore, it is impossible to vary the density of the cement during cementing.

The present invention thus provides a cementing material formulation having simultaneously low densities and excellent physical properties, notably compressive strength and permeability. This combination of low densities and of improved physical properties in relation to the state of the art is achieved by foaming cements whose packing volume fraction is maximized by adjusting the proportions of the various grain size classes that make up the material.

SUMMARY OF THE INVENTION

In general terms, the present invention relates to a cementing material comprising:

at least one hydraulic binder from the group consisting of class G Portland cements, class H Portland cements, aluminous cements whose alumina content is at least above 30% by mass, and sulfoaluminous cements, microparticles from the group consisting of microsilica particles and silico-aluminate particles, whose grain size ranges between 0.1 and 30 µm, whose proportion ranges between 15% and 50% by mass in relation to the mass of hydraulic binder, mineral particles whose grain size ranges between 1 and 500 µm, whose proportion ranges between 10% and 35% by mass in relation to the mass of hydraulic binder, the proportion of particles being lower than the proportion of microparticles, a hydrosoluble polymer thinning agent whose proportion ranges between 0.1% and 8% by mass in relation to the mass of hydraulic binder, water whose proportion is at most 40% by mass in relation to the mass of hydraulic binder, a foaming agent whose proportion ranges between 0.1% and 10% by mass in relation to the mass of hydraulic binder.

According to the invention, the material can also comprise a foam stabilizing additive whose proportion ranges between 0.1% and 2% by mass in relation to the mass of hydraulic binder, the additive being a hydrosoluble associative polymer comprising hydrophobic units.

The foaming agent can consist of a surfactant compound in a proportion ranging between 0.1% and 3% by mass in relation to the mass of hydraulic binder. The surfactant compound can be selected from among the following products: abietic acid salts, sodium alkyl-aryl sulfonates, phenol-ethoxylates and perfluoroalkyl betaine.

The foaming agent can also be a hydrosoluble polymer referred to as "associative polymer", comprising hydrophobic chains, the polymer being in a proportion ranging between 0.1% and 10% by mass in relation to the mass of hydraulic binder. The associative polymer can be a polymer with hydrophilic units Hy and hydrophobic units Hb containing C1 to C30 alkyl, aryl, alkyl-aryl groups. The associative polymer can have a molecular mass of between $10^4$ and $5 \times 10^6$ daltons and a proportion of hydrophobic units Hb ranging between 0.5% and 60%.

According to the invention, the mass of microparticles can range between 15% and 30% in relation to the mass of hydraulic binder.

The proportion of water can range between 20% and 35% by mass in relation to the mass of hydraulic binder.

According to the invention, the hydrosoluble polymer thinning agent can be selected from among the group consisting of: a polynaphthalene sulfonate, a polycarboxylate and a polyoxyethylene polycarboxylate.

The cementing material according to the invention can also comprise a retarding agent for controlling the setting time of the slurry.

The cementing material according to the invention can further comprise an accelerating agent for controlling the setting time of the slurry.

The cementing material according to the invention can be used for cementing an oil well.

The invention also relates to a method of producing a foamed cement slurry wherein the following stages are carried out:

mixing a powder with water comprising a hydrosoluble polymer thinning agent so as to obtain a cement slurry, the powder comprising a hydraulic binder, microparticles and mineral particles, the hydraulic binder being selected from the group consisting of class G Portland cements, class H Portland cements, aluminous cements whose alumina content is at least above 30% by mass, and sulfoaluminous cements, the microparticles being selected from the group consisting of microsilica particles and silico-aluminate particles, of grain size ranging between 0.1 and 30 µm, whose proportion ranges between 15% and 50% by mass in relation to the mass of hydraulic binder, the mineral particles having a grain size ranging between 1 and 500 µm, with a proportion ranging between 10% and 35% by mass in relation to the mass of hydraulic binder, the proportion of particles being lower than the proportion of microparticles, the hydrosoluble polymer thinning agent having a proportion ranging between 0.1% and 8% by mass in relation to the mass of hydraulic binder, introducing a foaming agent in the cement slurry, the proportion of foaming agent ranging between 0.1% and 10% by mass in relation to the mass of hydraulic binder, pumping the cement slurry comprising the foaming agent, and injecting a gas into the cement slurry comprising the foaming agent and stirring the mixture of slurry and of gas so as to foam the slurry and to obtain a foamed cement slurry.

In the method according to the invention, the foaming agent can be a surfactant compound in a proportion ranging between 0.1% and 3% by mass in relation to the mass of hydraulic binder. The surfactant can be introduced in powder form in the cement slurry. The foaming agent can also be a hydrosoluble associative polymer comprising hydrophobic chains, the polymer being in a proportion ranging between 0.1% and 10% by mass in relation to the mass of hydraulic binder.

In the present invention, the cement material of the walls separating the foam bubbles thus has a higher compactness than the materials commonly used in the profession. The porosity of the cement pastes of these new materials was measured by means of a mercury-pump porosimeter and it is below 12%, whereas the porosity of the cement pastes of conventional foamed cements is above 25%.

The walls between the bubbles of the cement foam described in the invention being less porous (or more compact, which is equivalent), the permeability and the mechanical strengths are therefore higher than those of the foamed cements obtained from a conventional cement slurry, whose water content is above 40% by weight of cement.

High-performance cements being very fluid, it is difficult to obtain, from these slurries, a stable foam, i.e. whose bubbles do not coalesce. If the bubbles coalesce before the cement hardens, the hardened material will be very permeable and have little mechanical strength. Adjustment of the proportions of the various aggregates that make up the cement slurry according to the invention allows to obtain a stable cement foam, despite the high fluidity of the cementing material. The invention described in this patent allows to obtain stable high-performance cement foams and therefore, in fine, a hardened material of very low permeability and thus of improved durability.

Furthermore, the setting time of the formulations developed in the present invention is shorter than the setting time of a conventional foamed cement. In fact, it is known to the man skilled in the art that the setting time decreases when the water/cement ratio decreases. Thus, the formulations developed within the scope of the present invention can be preferred to conventional foamed cements when the temperatures of the wells are low.

Thus, the foamed cement formulations according to the present invention allow to carry out all the cementing operations required in the case of wells drilled in low-cohesion formations. The formulations of the present invention can also be used for cementing cavernous, fault zones and more generally zones where fluid losses occur during drilling.

BRIEF DESCRIPTION OF THE FIGURES

Other features and advantages of the invention will be clear from reading the description hereafter, with reference to the accompanying figures wherein:

FIGS. 1 and 2 are photographs of a foamed cement with a foam stability problem,

FIG. 3 is a photograph of a stable foamed cement obtained according to the invention, FIG. 4 diagrammatically shows a method of producing a foamed cement slurry according to the invention.

DETAILED DESCRIPTION

Figure 4:
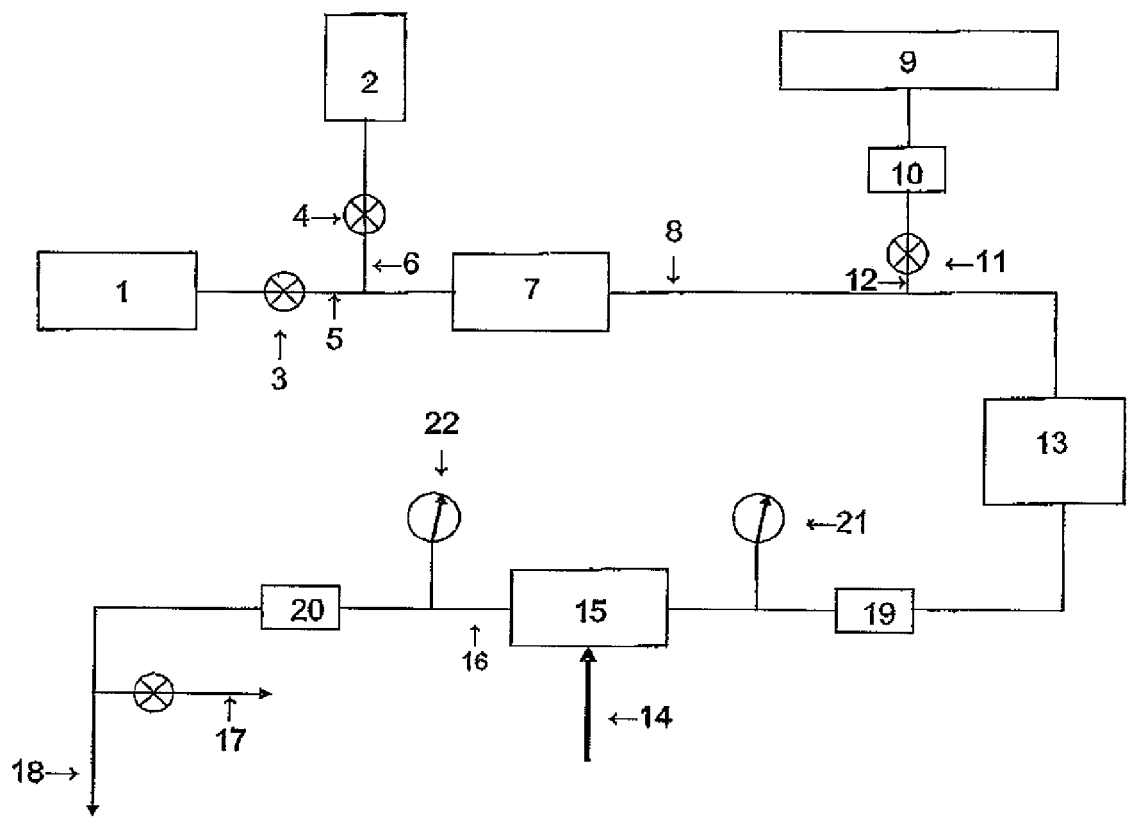

According to the invention, the low density and the excellent physical properties (compressive strength and permeability) of the cementing material formulations are optimized by combining the following constituents:

a hydraulic binder from the group consisting of the Portland cements and other hydraulic binders, for example of aluminous cement type, whose alumina content is above 30%, or sulfoaluminous cement, or plaster, a microsilica (also referred to as silica fume) of grain size ranging between 0.1 µm and 30 µm (the BET surface area can range between 10 and 30 m$^2$/g, preferably 18 m$^2$/g), whose proportion in the composition according to the invention ranges between 15% and 50% by mass in relation to the mass of hydraulic binder. In the invention, the microsilica can be replaced by fly ash (silico-aluminous, sulfocalcic or silicocalcic particles), a mineral addition of grain size ranging between 1 µm and 500 µm (which corresponds to a D50 ranging between 35 µm and 210 µm, or to a specific surface ranging between 0.03 m$^2$/g and 0.65 m$^2$/g). The amount of mineral added ranges between 10% and 35% by mass in relation to the mass of hydraulic binder. The proportion of mineral added remains lower than the proportion of microsilica so as to respect optimization of the compactness of the packing of the various aggregates, a superplasticizing agent, also referred to as hydrosoluble thinning agent, in a proportion ranging between 0.1% and 8% by mass in relation to the mass of hydraulic binder. The thinning agent can be either a polynaphthalene sulfonate or a polycarboxylate, or a polyoxyethylene polycarboxylate, water in a proportion of at most 40% by mass in relation to the mass of hydraulic binder. It more particularly ranges between 15% and 40%, preferably between 20% and 35%, a foaming agent whose concentration ranges between 0.1% and 10% by mass in relation to the mass of hydraulic binder. This foaming agent can be an anionic surfactant (such as sodium dodecyl sulfate) or a non-ionic surfactant, or a hydrosoluble polymer comprising hydrophobic links (referred to as associative polymers), or an air-entraining product, or a mixture of these molecules, and possibly a foam stabilizing additive. This additive can be a hydrophobic modified hydrosoluble polymer.

The Portland cements can be Black Label, HTS or CEMOIL cement manufactured by the Dyckerhoff, Lafarge and CCB Companies respectively. The aluminous cements can be the Secar 51 or Ternal cements manufactured by the Lafarge Aluminates Company.

When the foaming agent is a surfactant compound, it can be in a proportion ranging between 0.1% and 3% by mass in relation to the mass of hydraulic binder. The surfactants used in the cement slurry formulation according to the invention can be fatty alcohol sulfates also referred to as alkylsulfates of general formula R—O—SO$_3$X where X can be a sodium, ammonium or alkylolamine salt and R a hydrocarbon chain comprising a number of carbon atoms ranging between 8 and 20. Another surfactant class can be the one corresponding to the alkylethersulfates, which comprise between 1 and 10 groups of ethylene oxide. The general formula of these products is R—O—(CH$_2$CH$_2$O)$_n$—SO$_3$X where n ranges between 1 and 10 and R is a hydrocarbon chain comprising a number of carbon atoms ranging between 8 and 20. The surfactants of general formula R—(C$_6$H$_6$)—O—(CH$_2$—CH$_2$—O)$_n$—SO$_3$X where n ranges between 3 and 15 and R is a hydrocarbon chain comprising a number of carbon atoms ranging between 8 and 20 can also be used to obtain a cement foam. Phenol-ethoxylates of general formula R—(C$_6$H$_6$)—O—(CH$_2$O)$_n$—HNa where n ranges between 3 and 15 and R is a hydrocarbon chain comprising between 8 and 18 carbon atoms can be used as foaming agent. Similarly, a cement foam can be obtained using sodium sulfonate alkyl-aryl surfactants of general formula R—(C$_6$H$_6$)—SO$_3$Na where R is a hydrocarbon chain comprising between 8 and 18 carbon atoms. Non-ionic surfactants of general formula R—(COO)—(CH$_2$CH$_2$)—(CH$_2$—CH$_2$—O)$_n$—OH where n ranges between 1 and 24, as well as non-ionic surfactants whose hydrophobic part is a hydrocarbon chain of formula CH$_3$(CH$_2$)$_m$ and whose hydrophilic part is an oxyethylene chain of formula (CH$_2$CH$_2$O)$_n$ where m ranges between 8 and 20 and n ranges between 2 and 24 can also be used in the invention. The hydrophilic groups can also be sugars or glycerol derivatives. These types of surfactant, notably alkylpolyglucosides, have a higher efficiency in the formation of foams and their use is advantageous in highly salted media such as cement slurries. Furthermore, these surfactants have a very good biodegradability. Cationic surfactants can be used, notably alkylamine salts of general formula:

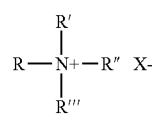

where R is a hydrocarbon chain consisting of 8 to 20 carbon atoms, R', R" and R'" correspond to hydrogen atoms or methyl, ethyl, benzyl or oxyethylene groups, and X an anion.

The foaming agent can also be abietic acid salt of general formula C$_{20}$H$_{30}$O$_2$—X, where X is a sodium, potassium salt.

Advantageously, zwitterrionic surfactants can be used, for example alkyl amidobetaine of general formula $C_nH_{2n+1}CONH(CH_2)_3N^+(CH_3)_2CH_2COO^-$ where n ranges between 10 and 18. It is also possible to use the fluorinated form of this surfactant. Perfluoroalkyl betaine gives good quality and stable foams. Perfluorobetaine also affords the advantage of being chemically stable at high temperatures.

A mixture of these surfactants can be advantageously used. This mixture can also comprise cosurfactants. These cosurfactants can be fatty alcohols.

When the foaming agent is an associative polymer, it can be in a proportion ranging between 0.1% and 10% by mass in relation to the mass of hydraulic binder.

The associative polymers used in the composition of the cement slurry according to the invention can be a polymer with hydrophilic (Hy) and hydrophobic (Hb) units in aqueous solution, the hydrophobic units (Hb) containing C1 to C30 alkyl, aryl, alkyl-aryl groups, the polymer having the following structure -(Hb)-(Hy)- with a statistical distribution with:

Hy of the form:

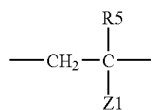

where R5 is H or $CH_3$, Z1 is COOH or $CONH_2$ or $CONHR1SO_3^-$ or CONHR"1, R"1 is $CH_3$,
or of the form:

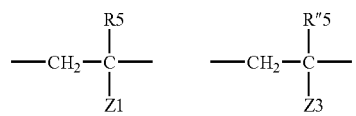

where R5 is H or $CH_3$, Z1 is $CONH_2$ or CONHR"1, R"1 is $CH_3$ and R"5 is H or $CH_3$, Z3 is COOH or $CONHR1SO_3^-$, and where R1 is $C_3H_8$ or $C_6H_5$, Hb is of the form:

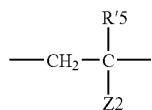

where R'5 is H or $CH_3$ and Z2 is COOR7, COOR'1, CONR1R'1 or CONR1R7, R7 being a non-ionic surfactant consisting of an alkyl polyoxyethylene chain, R1 is H or a C1-C30 alkyl, aryl or alkyl-aryl radical, and R'1 is a C1-C30 alkyl, aryl or alkyl-aryl radical.

In particular, the polymer can have a molecular mass of between $10^4$ and $5 \times 10^6$ daltons, more precisely between $10^4$ and $1.5 \times 10^6$, and a proportion of hydrophobic units Hb ranging between 0.5 and 60%.

According to the present invention, the associative polymer can also be a derivative of the hydrophilically and hydrophobically modified galactomanane described in U.S. Pat. No. 4,960,876. This associative polymer is produced by the Lamberti Company and marketed under references HPG19, HPG21, HM21, HM22. The molecular mass of the modified galactomanane can be below $5 \times 10^6$ daltons, preferably below $2 \times 10^6$ daltons. The hydrophobic group can be a linear or branched alkyl radical, saturated or with an ethylene unsaturation, comprising between 10 and 32 carbon atoms, preferably between 12 and 30. Adding to the cement slurry a proportion of hydrophilically and hydrophobically modified galactomanane derivative or a proportion of a mixture of hydrophobically modified hydrosoluble polymers as described above and of hydrophilically and hydrophobically modified galactomanane derivatives allows to obtain cement foams of different densities, lower than the initial density of the cement slurry.

The associative polymer can be selected from the group consisting of:

HMPAM1: where R5 is H and Z1 is $CONH_2$, R'5=$CH_3$, Z2 is COOR'1 with R'1=$C_9H_{19}$, HMPAM2: where R5 is H and Z1 is $CONH_2$, R'5=H, Z2 is CONR'1R'1 with R'1=$C_6H_{13}$, HMPAM3: where R5 is H and Z1 is CONH2, R"5=H, Z3 is COOH or $CONHR1SO_3$, where R1 is $C_3H_8$ (AMPS), R'5=H, Z2 is CONR'1R'1 with R'1=$C_6H_{13}$, S1: where R5 is H and Z1 is $CONH_2$, R'5=H and Z2 is $C_6H_4SO_3H$, HB1: where R5 is H, Z1 is COOH, R'5 is H and Z2 is COOR'1 with R'1=$C_4H_9$.

In particular, the polymer called HMPAM1 or HMPAM2 or HMPAM3 can have a molecular mass of between $5 \times 10^5$ daltons and $2 \times 10^6$ daltons, and a proportion of hydrophobic units (Hb) ranging between 0.5 and 3%.

Polymer S1, an acrylamide (Hy)/styrene sulfonate (Hb) copolymer, branched or not, according to the description above can have a molar ratio of about 50/50 and a molar mass ranging between $5 \times 10^5$ daltons $5 \times 10^6$ daltons. If it is branched, it is referred to as S2. The branching agent used in this case can be N,N' methylene bis acrylamide MBA.

Polymer HB1, an acrylate (Hy)/butyl acrylate (Hb) copolymer, with R5 being H, Z1 COOH, R'5 H and Z2 COOR'1 with R'1 C4, can comprise between 50% and 80% acrylate units, and have a molecular mass of between $10^4$ and $5 \times 10^6$ daltons, preferably between $10^4$ and $5 \times 10^4$ daltons.

In order to obtain a cement slurry as stable as possible, proportions of the various constituents of the cement slurry can be selected from the following range:

20 g to 50 g microsilica or fly ash to 100 g hydraulic binder, the microsilica preferably having a specific surface ranging between 10 and 30 $m^2/g$, 10 g to 35 g mineral addition to 100 g hydraulic binder, the mineral addition preferably having a D50 ranging between 35 and 210 µm, for example between 35 and 90 µm or between 140 and 210 µm.

When a surfactant is added to a slurry conventionally used in the profession (which behaves like a Bingham fluid) and stirred so as to entrain air within, the presence of the yield point prevents migration of the air bubbles created. Migration of the air bubbles can lead either to a non-foamed slurry when the air bubbles migrate to the surface, or to a very weakly foamed slurry (with a higher density than that expected), or to a foamed or very little foamed slurry but with a greatly connected foam structure (due to the coalescence of the air bubbles). The presence of a yield point in the slurry to be foamed is an advantage when it is desired to obtain high-quality foamed cements. In the case of cement slurries comprising various grain sizes, there is not necessarily a yield point: the slurry has a Newtonian type behaviour. It is then difficult to maintain the air bubbles evenly distributed in the volume. To obtain a stable and homogeneous foam with these very fluid slurries, there are several solutions. Viscosifiers such as those known and used in the profession can for example be added. It is also possible to add to the very fluid cement slurry formulation associative polymers in proportions ranging between 0.1% and 2.0%, and preferably between 0.1% and 1.0%. Another way to obtain stable foams from very fluid slurries (i.e. having a very low yield point or with a Newtonian behaviour) consists in preparing the cement slurry, then in adding the surfactant in powder form just before stirring. It has been observed in the laboratory that with this method the foams obtained were more stable than when the surfactant was added in liquid form. To obtain homogeneous foamed cements with different densities, the stirring time has to be optimized. The stirring time depends on the type of slurry, on the type of surfactant used and possibly on the presence of a viscosifier: each case requires optimization of the stirring time (stirring is understood to be entrainment of air in the slurry). For example, above a certain stirring time, it has been observed in the laboratory that the density no longer decreases. It has also been noticed that too long a stirring time could eventually break the cement foam. Producing a foamed cement from a cement slurry more fluid (fluid means that the yield point is low or non-existent, like the cement slurries involving different grain sizes, such as the cement slurry according to the invention) than those generally used in the profession is not a trivial operation.

The cement slurry comprising different grain sizes is very fluid and, according to circumstances, there may be an absence of yield point, i.e. the cement flows only under the effect of the gravity force. This fluidity can be the cause for a lack of stability of the cement foam. An associative polymer can be added to improve the foam stability, in a proportion ranging between 0.1% and 2%, preferably between 0.1% and 1%. This associative polymer allows to increase the viscosity of the slurry, which has the effect of limiting coalescence of the gas bubbles.

When the foaming agent is an associative polymer, the cement formulation does not necessarily require a foam stabilizing additive. In fact, certain associative polymers, for example HB1, simultaneously allow to foam the cement slurry and to stabilize the foam.

Furthermore, the formulation of the cementing material according to the invention can comprise a retarding agent allowing to retard the setting time of the cement slurry.

The retarding agents can be organic products or water-soluble mineral materials.

Among the organic products, the following molecules can be distinguished:
(calcium, sodium) lignosulfonates whose sugar proportions are below 20%,
acids and salts (sodium, potassium, calcium) of hydroxycarboxylic acids,
oxalic and gluconic acids, efficient with very low dosages,
sodium gluconate of formula $CH_2OH(CHOH)_4COONa$ is very active for retarding materials containing hydraulic binders,
calcium gluconate,
carbon hydrates of general formula $C_n(H_2O)_n$; among these molecules, the saccharose of formula $C_{12}H_{22}O_{11}$ is very efficient; it is also possible to use glucoses ($C_6H_{12}O_6$), starch ($C_6H_{10}O_5)_n$, and cellulose,
corn syrup.

These organic products can be used in dosages ranging between 0.1% and 5% by mass of dry extract in relation to the mass of hydraulic binder.

Among the retarding agents based on mineral salts, the following products can be used:
boron compounds used with very low dosages can be used to retard the cementing materials; boric acid ($BO_3H_3$), borax ($Na_2B_4O_7 10H_2O$), sodium metaborate $Na_2B_2O_4$ and sodium tetraborate ($Na_2B_4O_7$) can be preferably used,
tin sulfate ($S_2SO_4$),
lead acetate ($Pb(C_2H_3O_2)_2$),
calcium monophosphate ($Ca(H_2PO_4)_2$).

These retarding agents based on mineral salts can be used with dosages ranging between 0.1% and 2% by mass in relation to the mass of hydraulic binder.

Furthermore, the formulation of the cementing material according to the invention can comprise an accelerating agent allowing to accelerate the setting time of the cement slurry. This accelerating agent can be used for cementing zones with low temperatures between −4° C. and 10° C. For example, the zones close to the sea bottom in deep-sea drilling can be at temperatures of about 4° C.

The accelerating agents can be selected from among the following products:
calcium chloride ($CaCl_2$),
calcium nitrite ($Ca(NO_2)_2$),
calcium formiate ($Ca(HCO_2)_2$).

These products can be used at concentrations ranging between 0.5% and 5% by mass in relation to the mass of hydraulic binder. For temperatures below 15° C., calcium chloride should not be used at concentrations above 2.5% in relation to the mass of cement. Above this concentration, it behaves like a setting retarding agent under low-temperature conditions.

Non-chlorinated accelerating agents available on the market can also be used.

Depending on the proportion of the various constituents mentioned above, the foamed cement obtained may not be stable as shown in FIGS. 1 and 2. In fact, depending on the proportion of the various constituents, the slurry may have a segregation.

In this type of formulation, a considerable drainage occurs before the cement hardens. In FIG. 1, a two-phase system has formed with a cement slurry in lower part 1 and a very aerated and connected foam in upper part 2. FIG. 2 shows an enlargement of part 2 of FIG. 1. Such a foamed cement formulation is not satisfactory for well cementing. According to the invention, the proportion of the different constituents has been optimized to obtain a stable and homogeneous foamed cement with improved properties. Obtaining stable foamed cements with improved properties notably requires optimizing the grain packing and the amount of foaming agents. FIG. 3 shows the foamed cement structure obtained according to the present invention: it can be clearly seen that the bubbles have not coalesced. The bubbles are separate and independent.

The following cement slurry formulations allow to illustrate the invention.

The influence of the foaming agent concentration was evaluated for a slurry comprising: a water/cement ratio E/C=0.27; microsilica=24%; mineral addition=20%.

| | Anionic surfactant concentration (g/100 g cement) | | |
|---|---|---|---|
| | 0.25 | 0.40 | 0.75 |
| Density (g/cm$^3$) | 1.70 | 1.32 | 1.24 |
| Rc (MPa) | 32 | 17 | 12.5 |

The influence of the foaming agent concentration was evaluated for a slurry comprising: a water/cement ratio E/C=0.27; microsilica=50%; mineral addition=20%.

|  | Anionic surfactant concentration (g/100 g cement) | | | |
| --- | --- | --- | --- | --- |
|  | 0 | 0.25 | 0.5 | 0.75 |
| Density (g/cm³) | 2.25 | 2.03 | 1.74 | 1.63 |
| Rc (MPa) | 123 | 74 | 40 | 39 |

The influence of the foaming microsilica content was evaluated for a slurry comprising: a water/cement ratio E/C=0.27; mineral addition=20%, foaming agent (surfactant) concentration=0.75%.

|  | Microsilica content (g/100 g cement) | | |
| --- | --- | --- | --- |
|  | 24 | 30 | 50 |
| Density (g/cm³) | 1.24 | 1.42 | 1.63 |
| Rc (MPa) | 12.5 | 19 | 39 |

By varying the amount of foaming agent between 0 and 0.75%, it is observed that it is possible to lower the density of the material from 2.25 to 1.24 g/cm³.

When an identical amount of foaming agent (0.75% for example) is added, it is observed that lower densities are obtained when the amount of microsilica is small. Foamed cements of lower densities are obtained by selecting formulations comprising microsilica amounts ranging between 15% and 30% by mass in relation to the mass of hydraulic binder.

Finally, it can be noted that the formulations with 50% microsilica afford a very high compressive strength Rc. Thus, for a formulation of density 1.63 g/cm³ containing 50% microsilica and prepared according to the invention, the compressive strength is 39 MPa, which is above the value measured for a non-foamed cement paste of density 1.9 g/cm³. The cementing materials obtained according to the invention thus allow to reach low densities without losing their mechanical strength however.

Two cement slurries of equivalent density are compared: a conventional foamed cement and a high-performance foamed cement according to the invention.

Conventional foamed cement formulation:
Class G Portland cement: 100
Water/Cement: 44%
Sodium Dodecyl Sulfate/Cement: $4.4 \times 10^{-2}$%.
High-performance foamed cement formulation according to the invention:
Class G Portland cement: 100
Water/Cement: 27%
Microsilica: 24%
Mineral addition: 20%
Sodium Dodecyl Sulfate/Cement: 0.625%.

The following table allows to compare the properties of the two materials:

| Measured quantities | Conventional foamed cement | High-performance foamed cement |
| --- | --- | --- |
| Density (g cm⁻³) | 1.32 | 1.30 |
| Compressive strength (MPa) | 6.8 | 18.4 |
| Bending strength (MPa) | 2.7 | 3.9 |
| Young's modulus (GPa) | 4.302 | 7.394 |
| Gas permeability (m²) | $3.9 \times 10^{-16}$ | $7.8 \times 10^{-17}$ |

From the values obtained for the two materials, it is clear that the high-performance foamed cement according to the invention has better properties than a conventional foamed cement as regards its mechanical strength and permeability.

It is very interesting to note that the permeability obtained for the high-performance foamed cement is equivalent to that of a non-lightened cement (of water/cement ratio 0.44) conventionally used for cementing casings in oil wells. In fact, the permeability of such a cement is $8 \times 10^{-17}$ m². Thus, although the material which is the object of the present invention has a markedly higher porosity (of the order of 50%) than a conventional cement, its permeability is equivalent, which is an advantage notably in terms of durability.

FIG. 4 diagrammatically shows a method of producing a foamed cement slurry according to the invention.

Mixer 7 allows to mix a powder comprising a hydraulic binder with microparticles and mineral particles added, as described above, coming from tank 1 through line 5, with water coming from tank 2 through line 6. The water contains thinning agents. Valves 3 and 4 allow to control and to adjust the amounts of water and of the powder mixture containing the hydraulic binder introduced in mixer 7. A homogeneous cement slurry is obtained at the outlet of mixer 7 and flows through line 8.

Tank 9 contains foaming agents: surfactants or hydrosoluble polymers comprising hydrophobic links. Foaming agents are injected by means of pump 10, valve 11 and line 12 into the cement slurry circulating in line 8. The surfactants can be introduced in the slurry in powder form just at the mixer outlet.

The cement slurry comprising foaming agents is pumped by slurry pump 13 until a high pressure ranging for example between 10 and 100 bars is reached.

A gas is then injected into the slurry at high pressure through line 14. The gas can be air or nitrogen. Injection of air into the cement slurry is achieved in foam generator 15 whose function is to stir the slurry and the gas so as to foam the cement slurry. Foam generator 15 can create turbulences in the slurry in different ways known to the man skilled in the art. A foamed cement slurry is obtained at the outlet of foam generator 15 and discharged through line 16.

The foamed cement slurry is either sent into a tank through line 17 or introduced into a well to be cemented through line 18.

Densimeters 19, 20 and pressure detectors 21, 22 allow to control the density and the pressure of the slurry prior to and after foaming.

The invention claimed is:

1. A method of producing a foamed cement slurry, wherein the following stages are carried out:
mixing a powder with water comprising a hydrosoluble polymer thinning agent so as to obtain a cement slurry, the powder comprising a hydraulic binder, microparticles, mineral particles, and a foam stabilizing additive, the hydraulic binder being selected from the group consisting of class G Portland cements, class H Portland cements, aluminous cements whose alumina content is at least above 30% by mass, and sulfoaluminous cements, the microparticles being selected from the group consisting of microsilica particles and silico-aluminate particles, of grain size ranging between 0.1 and 30 μm, whose proportion ranges between 15% and 50% by mass in relation to the mass of hydraulic binder, the mineral particles having a grain size ranging between 1 and 500 μm with a D50 comprised between 35 μm and 210 μm, with a proportion ranging between 10% and 35% by mass in relation to the mass of hydraulic binder, the proportion of particles being lower than the proportion of microparticles, the hydrosoluble polymer thinning agent having a proportion ranging between 0.1 and 8% by mass in relation to the mass of hydraulic binder, the foam stabilizing additive being a hydrosoluble associative polymer comprising hydrophobic units, the foam stabilizing additive proportion ranging between 0.1% and 2% by mass in relation to the mass of hydraulic binder, introducing a foaming agent in the cement slurry, wherein the foaming agent is a surfactant compound in a proportion ranging between 0.1% and 3% by mass in relation to the mass of hydraulic binder, pumping the cement slurry comprising the foaming agent, and injecting a gas into the cement slurry comprising the foaming agent and stirring the mixture of slurry and of gas so as to foam the slurry and to obtain a foamed cement slurry.

2. A method as claimed in claim 1, wherein the surfactant is introduced in powder form into the cement slurry.

3. A method as claimed in claim 1, wherein the surfactant compound is selected from the group consisting of abietic acid salts, sodium alkyl-aryl sulfonates, phenol-ethoxylates and perfluoroalkyl betaine.

4. A method as claimed in claim 1, wherein the associative polymer is a polymer with hydrophilic units Hy and hydrophobic units Hb containing C1 to C30 alkyl, aryl, alkyl-aryl groups.

5. A method as claimed in claim 4, wherein the associative polymer has a molecular mass of between $10^4$ and $5 \times 10^6$ daltons and a proportion of hydrophobic units Hb ranging between 0.5% and 60%.

6. A method as claimed in claim 1, wherein the mass of microparticles ranges between 15% and 30% in relation to the mass of hydraulic binder.

7. A method as claimed in claim 1, wherein the proportion of water ranges between 20% and 35% by mass in relation to the mass of hydraulic binder.

8. A method as claimed in claim 1, wherein the hydrosoluble polymer thinning agent is selected from the group consisting of: polynaphthalene sulfonate, a polycarboxylate and a polyoxyethylene poly-carboxylate.

9. A method as claimed in claim 1, further comprising adding a retarding agent for controlling the setting time of the slurry.

10. A method as claimed in claim 1, further comprising adding an accelerating agent for controlling the setting time of the slurry.

11. A method comprising using the foamed cement slurry produced by the method of claim 1 for cementing an oil well.

12. A method as claimed in claim 1, wherein the mineral particles are silica particles.

13. A method as claimed in claim 3, wherein the associative polymer is a polymer with hydrophilic units Hy and hydrophobic units Hb containing C1 to C30 alkyl, aryl, alkyl-aryl groups.

14. A method as claimed in claim 13, wherein the associative polymer has a molecular mass of between $10^4$ and $5 \times 10^6$ daltons and a proportion of hydrophobic units Hb ranging between 0.5% and 60%.

15. A method as claimed in claim 13, wherein the mineral particles are silica particles.

* * * * *